United States Patent
Hatae et al.

(10) Patent No.: US 10,764,540 B2
(45) Date of Patent: Sep. 1, 2020

(54) MONITORING SYSTEM

(71) Applicant: Panasonic Intellectual Property Management Co., Ltd., Osaka (JP)

(72) Inventors: Eiichi Hatae, Fukuoka (JP); Nobuyuki Wada, Fukuoka (JP); Hiroshi Tsuji, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 181 days.

(21) Appl. No.: 15/914,755

(22) Filed: Mar. 7, 2018

(65) Prior Publication Data

US 2018/0199009 A1 Jul. 12, 2018

Related U.S. Application Data

(63) Continuation of application No. 14/688,783, filed on Apr. 16, 2015, now abandoned.

(30) Foreign Application Priority Data

Nov. 20, 2014 (JP) ................ 2014-235959

(51) Int. Cl.
*H04N 7/18* (2006.01)
*G08B 13/196* (2006.01)
*H04N 1/00* (2006.01)

(52) U.S. Cl.
CPC ....... *H04N 7/181* (2013.01); *G08B 13/19656* (2013.01); *G08B 13/19682* (2013.01);
(Continued)

(58) Field of Classification Search
CPC ............................ H04N 7/181; G08B 13/1966
See application file for complete search history.

(56) References Cited

U.S. PATENT DOCUMENTS

2005/0197061 A1 9/2005 Hundal
2005/0262519 A1 11/2005 Luebke et al.
(Continued)

FOREIGN PATENT DOCUMENTS

JP 2004-080414 A 3/2004
JP 2005-080156 A 3/2005
(Continued)

OTHER PUBLICATIONS

International Search Report and Written Opinion dated Jul. 22, 2015, for corresponding International Application No. PCT/JP2015/001264, 13 pages.
(Continued)

*Primary Examiner* — Zhubing Ren
(74) *Attorney, Agent, or Firm* — Seed IP Law Group LLP

(57) ABSTRACT

In a monitoring system, when a monitoring display instruction is received from a smartphone, a master device transmits an image transmission request to a plurality of cameras, each of the cameras transmits image data obtained by an image capturing unit to the master device in response to the image transmission request from the master device, the master device generates a plurality of separate images in order to display images from the plurality of cameras on a single screen in a distributed manner, and transmits image data of a monitoring screen of the plurality of separate images to the smartphone, and the smartphone includes a display/input unit and displays the monitoring screen of the plurality of separate images transmitted from the master device on the display/input unit.

12 Claims, 11 Drawing Sheets

(52) U.S. Cl.
CPC . *G08B 13/19684* (2013.01); *G08B 13/19693* (2013.01); *H04N 1/00106* (2013.01); *H04N 1/00307* (2013.01); *H04N 7/186* (2013.01)

(56) References Cited

U.S. PATENT DOCUMENTS

| | | |
|---|---|---|
| 2009/0243834 A1 | 10/2009 | Sennett et al. |
| 2011/0285846 A1 | 11/2011 | Lee et al. |
| 2014/0218517 A1* | 8/2014 | Kim .................... H04L 12/2818 |
| | | 348/143 |
| 2014/0244858 A1* | 8/2014 | Okazaki ................ H04L 65/605 |
| | | 709/231 |
| 2015/0097961 A1* | 4/2015 | Ure ........................ G08B 5/223 |
| | | 348/159 |

FOREIGN PATENT DOCUMENTS

| | | |
|---|---|---|
| JP | 2005-109793 A | 4/2005 |
| JP | 2005-206309 A | 8/2005 |
| JP | 2007-323533 A | 12/2007 |

OTHER PUBLICATIONS

Cenelec, "SmartHouse Code of Practice," Cenelec Workshop Agreement (CWA 50487), Nov. 2005, 230 pages.
Home Gateway Initiative, "Home Gateway Technical Requirements: Residential Profile," Version 1.0, Apr. 29, 2008, 125 pages.
Extended European Search Report, dated Apr. 21, 2016, for corresponding EP Application No. 15195006.0-1810, 13 pages.

\* cited by examiner

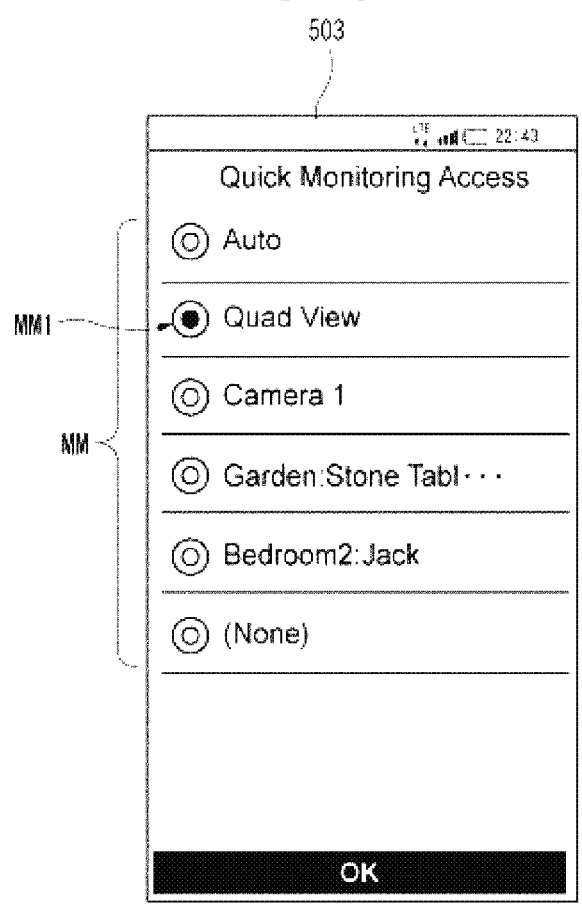

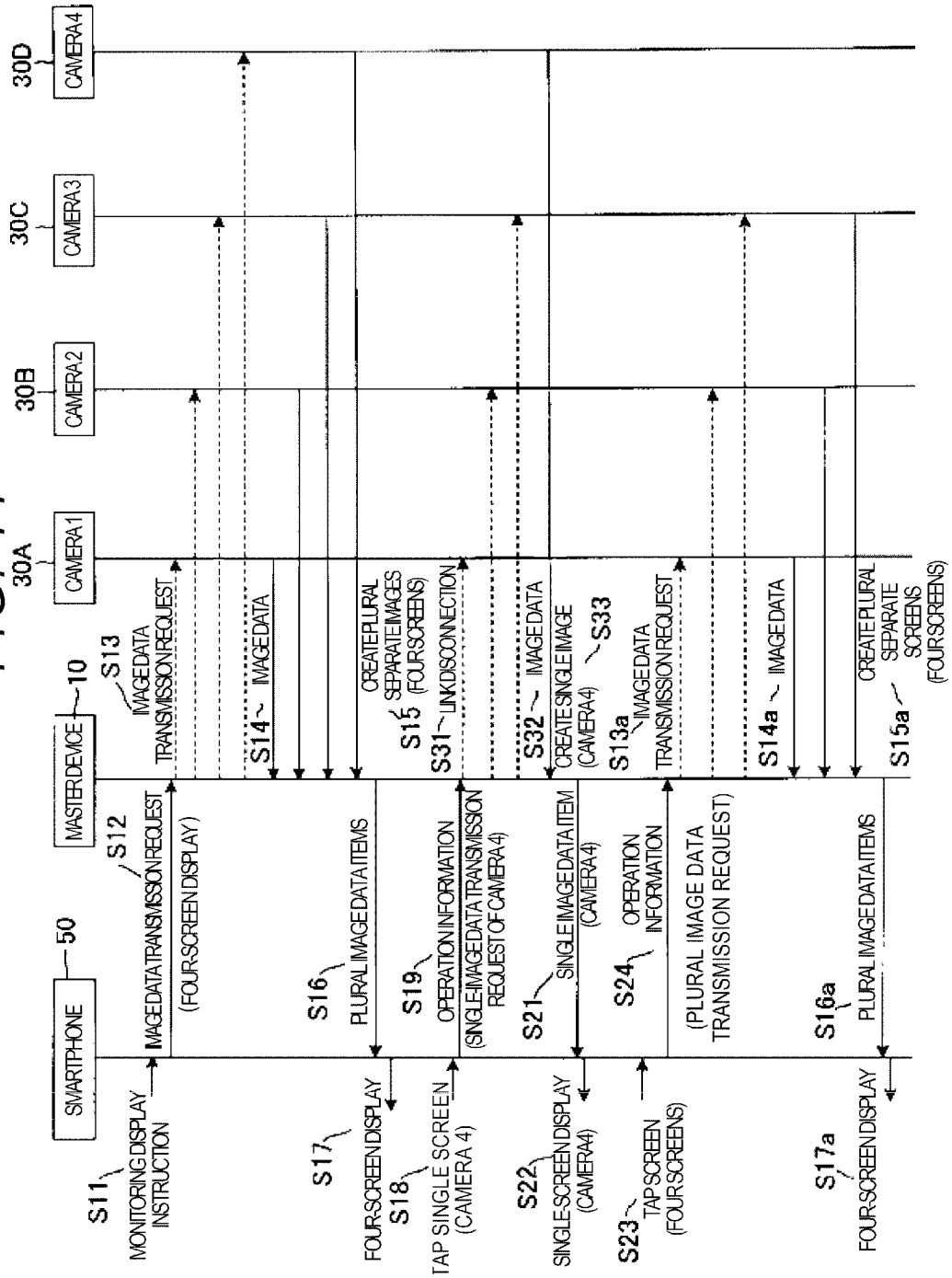

MONITORING SYSTEM

BACKGROUND OF THE INVENTION

1. Field of the Invention

The present invention relates to a monitoring system which performs data input and output between a mobile phone terminal and a camera.

2. Description of the Related Art

In the related art, as an example of a monitoring system in which data input and output are performed between a mobile phone terminal and a camera, there is a monitoring camera system which easily performs remote monitoring even from a remote location and monitors a monitoring target by using bidirectional communication of video and sound (for example, refer to Japanese Patent Unexamined Publication No. 2007-323533)

The monitoring system disclosed in Japanese Patent Unexamined Publication No. 2007-323533 includes a controller which is a monitoring server installed at an indoor distribution board in a predetermined house lot (within a house), a first camera unit which is an interphone slave device installed at an entrance door, a second camera unit which is installed in a dining room, a third camera unit which is installed in a bedroom, an indoor unit which is an interphone master device installed in a living room, and one or more mobile phones present at remote places. For example, in a case where a dweller is out, when each camera unit detects an intruder, the controller switches and transmits a captured video signal and a collected audio signal to the mobile phone so as to capture the intruder.

SUMMARY OF THE INVENTION

However, in the above-described configuration disclosed in Japanese Patent Unexamined Publication No. 2007-323533, since a video signal and an audio signal from each camera unit are appropriately switched and transmitted to the mobile phone so as to capture motion and sound of the intruder, a configuration of the controller is complex, and this inevitably leads to an increase in cost, and it is difficult to implement a monitoring system including the controller at low cost.

In order to solve the above-described problems, an object of the present invention is to provide a monitoring system which realizes data input and output between a mobile phone terminal and a camera without decreasing convenience for a user by using an existing fixed telephone which is connected to a fixed telephone network and can perform calls to other fixed telephones.

According to the present invention, there is provided a monitoring system including a plurality of cameras each of which includes an image capturing unit and has a call function; a master device that communicates with the camera, and is connected to a fixed telephone network so as to perform calls to other fixed telephones; and a mobile phone terminal that includes a display/input unit, performs wireless communication with the master device by using a wireless router, and is connected to other mobile phones via a mobile phone network, in which, when a monitoring display instruction is received from the mobile phone terminal, the master device transmits an image transmission request to the plurality of cameras, in which each of the cameras transmits image data obtained by the image capturing unit in response to the image transmission request from the master device, to the master device, in which the master device generates a plurality of separate images in order to display images from the plurality of cameras on a single screen in a distributed manner, and transmits image data of a monitoring screen of the plurality of separate images to the mobile phone terminal, and in which the mobile phone terminal displays the monitoring screen of the plurality of separate images transmitted from the master device on the display/input unit.

According to the present invention, it is possible to realize data input and output between a mobile phone terminal and a camera at low cost without decreasing convenience for a user by using an existing fixed telephone which is connected to a fixed telephone network and can perform calls to other fixed telephones.

BRIEF DESCRIPTION OF DRAWINGS

FIG. 8 is a diagram illustrating an example of a setting screen of the home security application;

FIG. 11 is a sequence diagram illustrating a second example of an operation procedure of the monitoring camera system.

DETAILED DESCRIPTION OF THE PREFERRED EMBODIMENT

With reference to the drawings, a description will be made of an embodiment (hereinafter, referred to as "the present embodiment") of a monitoring camera system related to the present invention. In the following present embodiment, as an example of a monitoring camera system related to the present invention, an exemplary monitoring camera system used for home security will be described. The present invention is not limited to a monitoring camera system, and may be represented as each of devices constituting the monitoring camera system, a method for each device, and a program.

A monitoring camera system of the present embodiment includes a plurality of cameras each of which includes an image capturing unit and has a call function; a master device that communicates with the monitoring camera, and is connected to a fixed telephone network so as to perform calls to other fixed telephones; and a mobile phone terminal that includes a display/input unit, performs wireless communication with the master device by using a wireless router, and is connected to other mobile phones via a mobile phone network, in which, when a monitoring display instruction is received from the mobile phone terminal, the master device transmits an image transmission request to the plurality of cameras, in which each of the cameras transmits image data obtained by the image capturing unit in response to the image transmission request from the master device, in which the master device generates a plurality of separate images in order to display images from the plurality of cameras on a single screen in a distributed manner, and transmits image data of a monitoring screen of the plurality of separate images to the mobile phone terminal, and in which the mobile phone terminal displays the monitoring screen of the plurality of separate images transmitted from the master device on the display/input unit.

Figure 1:
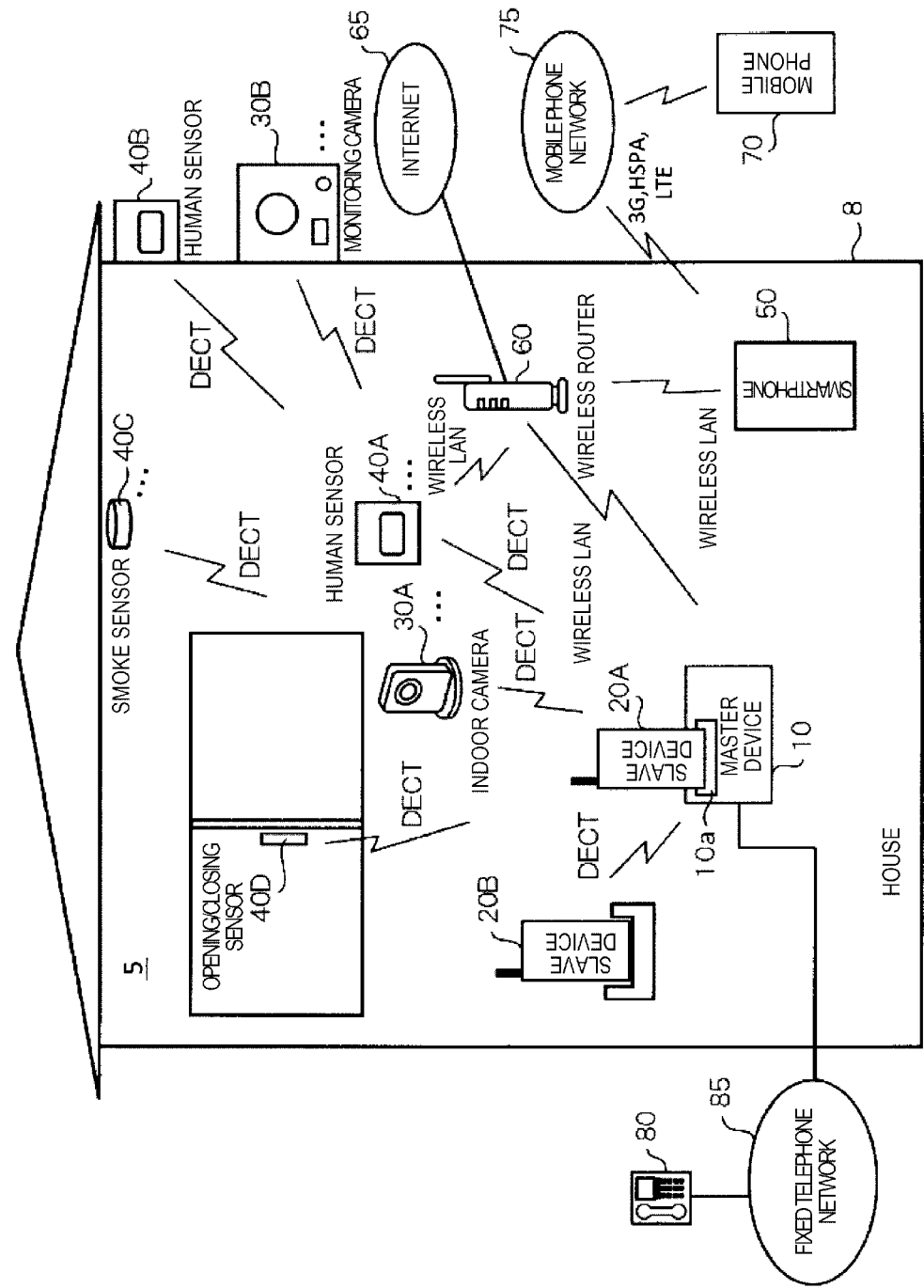
FIG. 1 is a diagram illustrating an example of a system configuration of a monitoring camera system of the present embodiment.

FIG. 1 is a diagram illustrating an example of a system configuration of monitoring camera system 5 of the present embodiment. Monitoring camera system 5 is mainly provided in house 8, and includes master device 10, two cordless slave devices 20A and 20B (hereinafter, simply referred to as "slave devices"), a plurality of cameras (specifically, indoor camera 30A, monitoring camera 30B, . . . ), various sensors (specifically, human sensors 40A and 40B, smoke sensor 40C, and opening/closing sensor 40D), smartphone 50, and wireless router 60. A configuration of monitoring camera system 5 is only an example and may be modified in various aspects.

Master device 10 functions as a gateway in monitoring camera system 5. Master device 10 is a control device which controls the entire operation of monitoring camera system 5, and is connected to the slave devices, the cameras, the sensors, and the like in a communicable manner by using a communication method such as digital enhanced cordless telecommunications (DECT). Master device 10 is connected to the Internet 65 (network) via wireless router 60 using a wireless LAN. Master device 10 is connected to fixed telephone network 85 in a wired manner and can perform a call to fixed telephone 80. Master device 10 has a function of charging slave device 20A which is inserted into insertion port 10a.

Slave devices 20A and 20B are connected to master device 10 in the DECT communication method and can perform a call to master device 10. Particularly, in a case where two slave devices 20A and 20B are not required to be differentiated from each other, the slave devices are collectively referred to as slave device 20.

Various sensors 40 (specifically, human sensors 40A and 40B, smoke sensor 40C, opening/closing sensor 40D, . . . ) are connected to master device 10 in the DECT communication method. Herein, as sensors, opening/closing sensor 40D which detects opening and closing of a window, smoke sensor 40C which detects smoke, and human sensors 40A and 40B which detect a person with infrared rays are used. Particularly, in a case where the sensors are not required to be differentiated from each other, the sensors are collectively referred to as sensor 40. As will be described later, infrared sensor 313 (refer to FIG. 4) built into camera 30 is also used as a human sensor.

A plurality of cameras (specifically, indoor camera 30A, monitoring camera 30B, . . . ) have a call function and are connected to master device 10 in the DECT communication method. Herein, as cameras, monitoring camera 30B which captures an image of an outdoor environment, and indoor camera 30A which captures an image of house 8, are used. Particularly, in a case where the cameras are not required to be differentiated from each other, the cameras are collectively referred to as camera 30.

Smartphone 50 is provided as an example of a mobile phone terminal. Smartphone 50 is connected to master device 10 via wireless router 60 using a wireless LAN, and is connected to mobile phone 70 or other smartphones via mobile phone network 75 using a communication method such as the third generation (3G) method, a high speed package access (HSPA) method, or a long term evolution (LTE) method.

Figure 2:
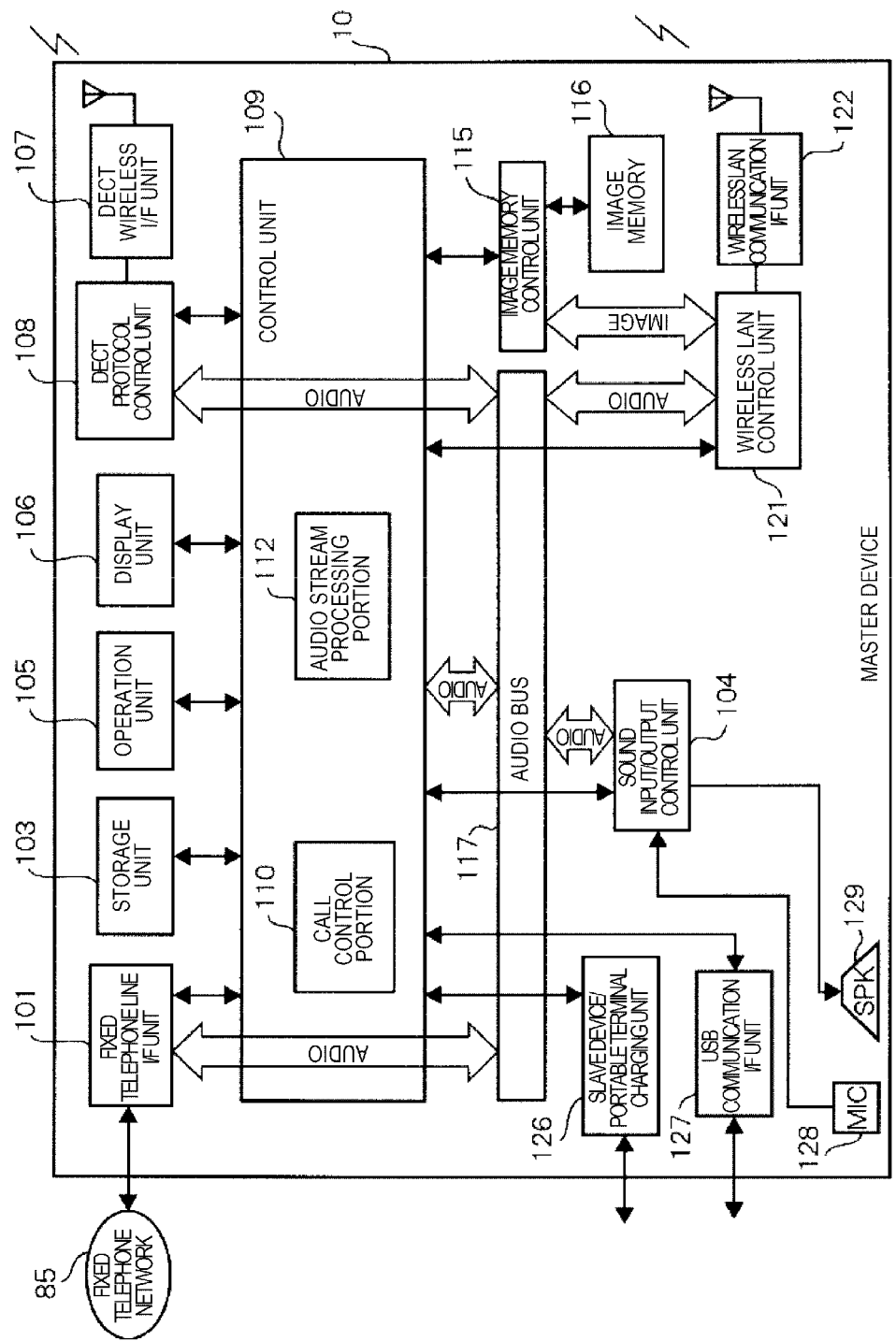
FIG. 2 is a block diagram illustrating an example of an internal configuration of a master device.

FIG. 2 is a block diagram illustrating an example of an internal configuration of master device 10. Master device 10 includes control unit 109, storage unit 103, operation unit 105, and display unit 106. Master device 10 receives various input operations and displays information such as image on display unit 106. Control unit 109 has call control portion 110 and audio stream processing portion 112 built thereinto, and performs call control during calling, processing of audio data, and the like.

Master device 10 includes image memory control unit 115 and image memory 116, and stores image data or the like captured by camera 30 in image memory 116.

Master device 10 includes wireless LAN control unit 121 and wireless LAN communication I/F unit 122, and transmits and receives image data and audio data to and from smartphone 50, camera 30, and the like via wireless router 60 connected over a wireless LAN.

Master device 10 includes DECT protocol control unit 108 and DECT wireless I/F unit 107, and performs wireless connection to slave device 20, sensor 40, and camera 30 by using a wireless method such as digital enhanced cordless telecommunications (DECT).

Master device 10 includes audio bus 117, sound input/output control unit 104, speaker 129, and microphone 128, and performs input and output of sound to and from an external device.

Master device 10 includes fixed telephone line I/F unit 101, and can perform a call to external fixed telephone 80 connected to fixed telephone network 85.

Master device 10 includes slave device/portable terminal charging unit 126 and charges slave device 20 or smartphone 50 inserted into insertion port 10a.

Master device 10 includes USB communication I/F unit 127, and transmits and receives data to and from an apparatus, a memory, or the like having an interface of a universal serial bus (USB) standard.

Master device 10 registers pairs of various sensors 40 and the plurality of cameras 30 in storage unit 103 in correlation with each other. For example, human sensor 40B and monitoring camera 30B are installed at close locations outdoors and are thus registered in correlation with each other. Monitoring camera 30B, as will be described later, integrally has infrared sensor 313 (refer to FIG. 4) which is a human sensor and is built thereinto, and is thus also registered in correlation with infrared sensor 313. Human sensor 40A, smoke sensor 40C, and opening/closing sensor 40D are all installed inside house 8 and are thus registered in correlation with indoor camera 30A.

Figure 3:
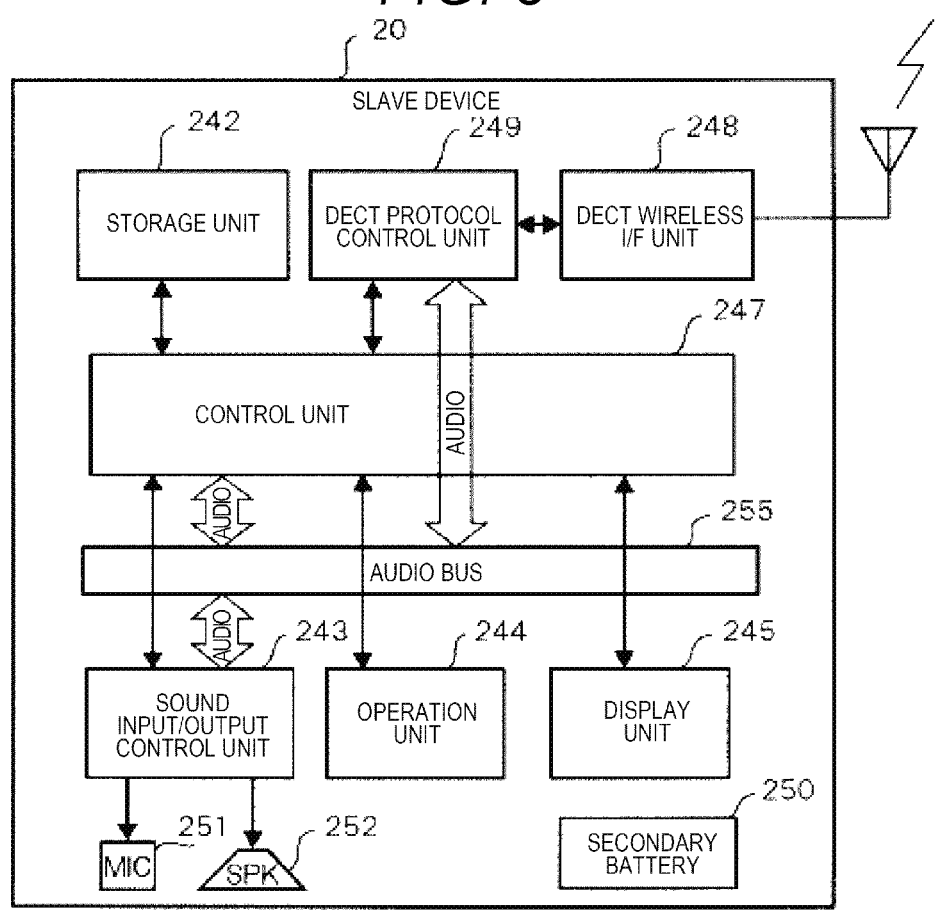
FIG. 3 is a block diagram illustrating an example of an internal configuration of a cordless slave device.

FIG. 3 is a block diagram illustrating an example of an internal configuration of (cordless) slave device 20. Slave device 20 includes control unit 247, storage unit 242, operation unit 244, and display unit 245. Slave device 20 receives various input operations and displays information such as image on display unit 245.

Slave device 20 includes DECT protocol control unit 249 and DECT wireless I/F unit 248, and performs wireless connection to master device 10, sensor 40, and camera 30 by using a wireless method such as DECT.

Slave device 20 includes audio bus 255, sound input/output control unit 243, speaker 252, and microphone 251, and performs input and output of sound to and from an external device.

Slave device 20 includes secondary battery 250 which is rechargeable, and, in a case of being used as a cordless slave device, each unit of slave device 20 is supplied with power from secondary battery 250 so as to perform an operation.

Figure 4:
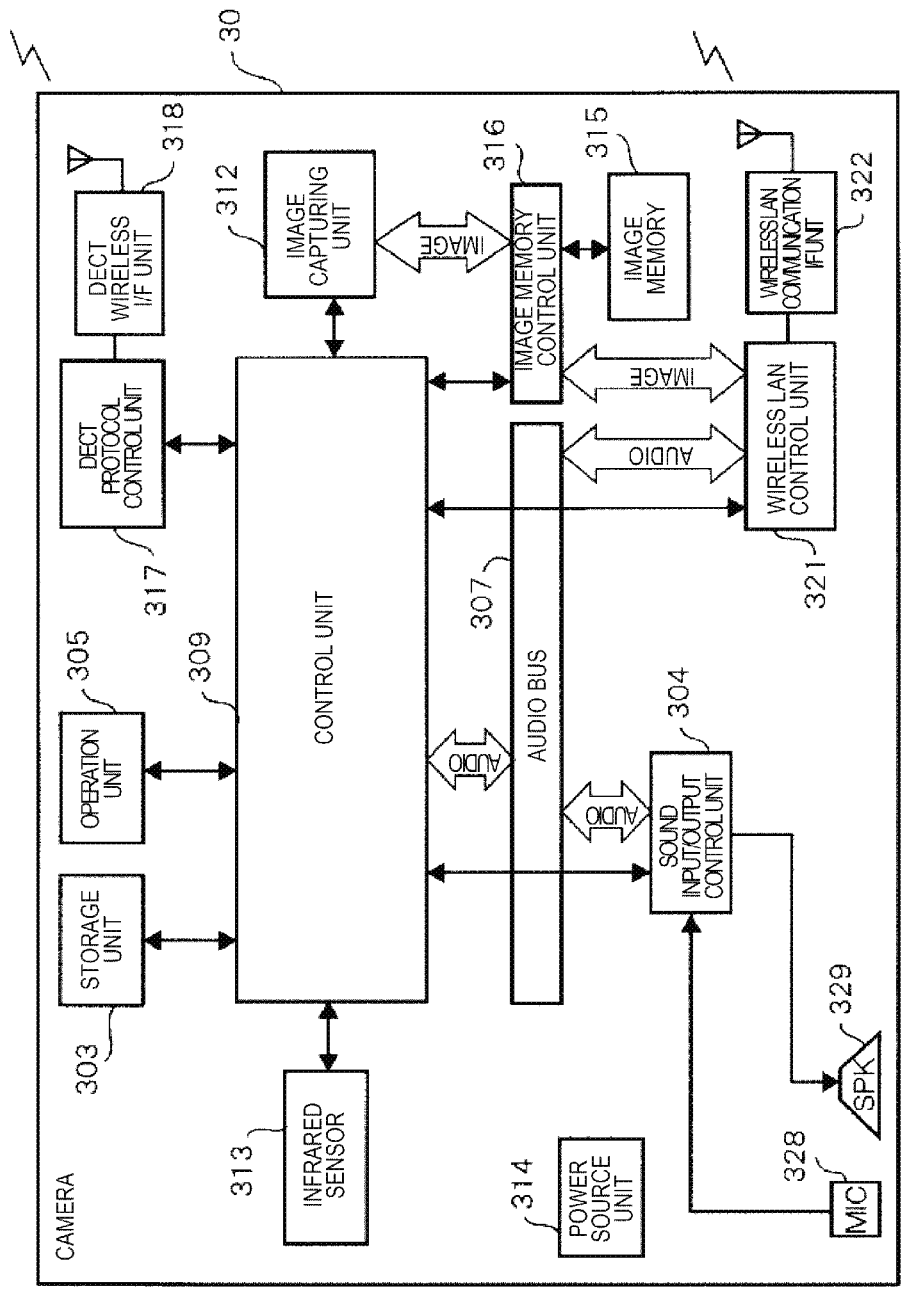
FIG. 4 is a block diagram illustrating an example of an internal configuration of a camera.

FIG. 4 is a block diagram illustrating an example of an internal configuration of camera 30. Indoor camera 30A and monitoring camera 30B as examples of cameras 30 have substantially the same configuration as each other. Camera 30 includes control unit 309, storage unit 303, and operation unit 305. Camera 30 performs an operation related to image capturing and also receives input operations.

Camera 30 includes DECT protocol control unit 317 and DECT wireless I/F unit 318, and performs wireless connection to master device 10 by using a wireless method such as DECT.

Camera 30 includes wireless LAN control unit 321 and wireless LAN communication I/F unit 322, and transmits and receives image data and audio data to and from master device 10, smartphone 50, and the like via wireless router 60 connected over the wireless LAN.

Camera 30 includes audio bus 307, sound input/output control unit 304, speaker 329, and microphone 328, and performs input and output of sound to and from an external device.

Camera 30 includes image capturing unit 312, image memory control unit 316, and image memory 315, and stores image data captured by image capturing unit 312 in image memory 315. Image capturing unit 312 has a lens and an imaging element (for example, an image sensor such as a charged coupled device (CCD) or a complementary metal oxide semiconductor (CMOS)).

Camera 30 integrally has infrared sensor 313 which is a passive infrared (PIR) sensor as a human sensor built thereinto. Infrared sensor 313 detects the presence of a person by detecting a change in heat (infrared rays) generated by the person. Camera 30 includes power source unit 314 which is constituted by a commercial AC power source, and each unit of camera 30 is supplied with power from power source unit 314 so as to perform an operation.

Figure 5:
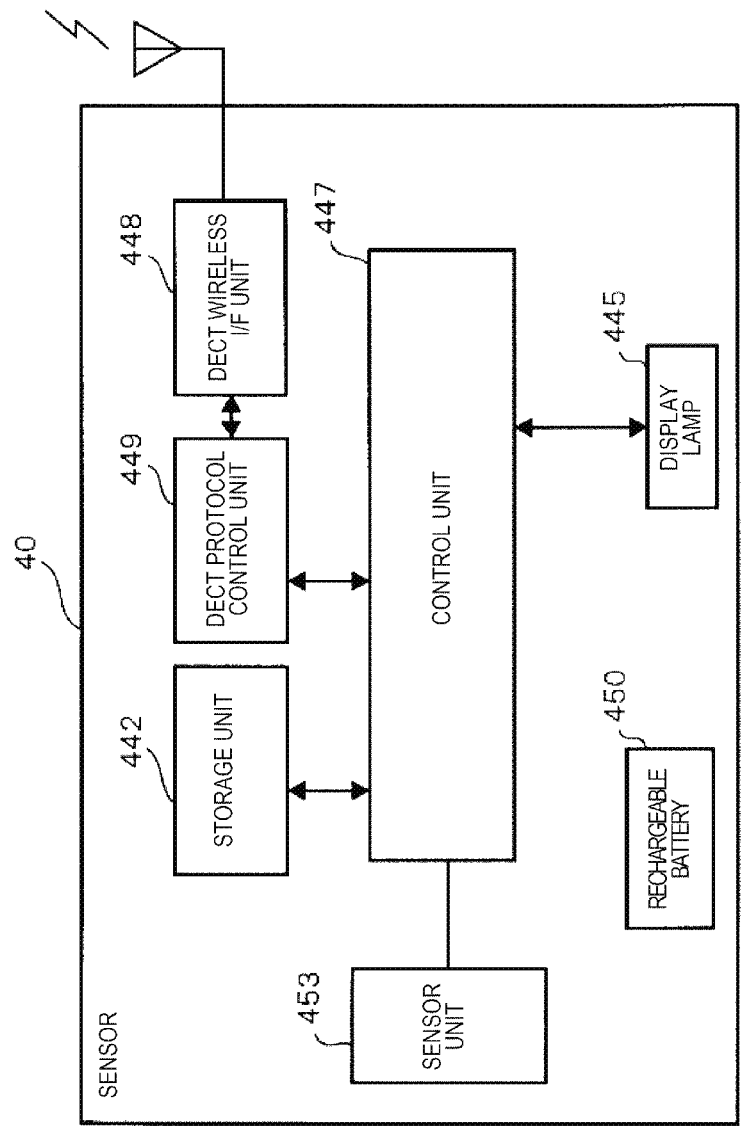
FIG. 5 is a block diagram illustrating an example of an internal configuration of a sensor.

FIG. 5 is a block diagram illustrating an example of an internal configuration of sensor 40. Sensor 40 includes control unit 447, storage unit 442, display lamp 445, and sensor unit 453. Sensor 40 performs a predetermined detection operation, such as turning on display lamp 445, in a case where a target (for example, an intruder which is also the same for the following description) is detected by sensor unit 453.

Sensor 40 includes DECT protocol control unit 449 and DECT wireless I/F unit 448, and performs wireless connection to master device 10 by using a wireless method such as DECT, and sends sensor detection information to master device 10 when a target is detected.

Sensor unit 453 differs depending on the kind of sensor 40. For example, in a case of human sensors 40A and 40B, sensor unit 453 is a PIR sensor which detects a person through a change in infrared rays. In a case of opening/closing sensor 40D which detects opening and closing of a front door, a window, or the like, sensor unit 453 is a reed switch which switches between turned-on and turned-off states due to opening and closing. In a case of smoke sensor 40C, sensor unit 453 is a light emitting/receiving unit which detects smoke when emitted light is blocked by the smoke. Sensor unit 453 may be a temperature sensor which can detect an ambient temperature.

Sensor 40 includes secondary battery 450 which is rechargeable, and each unit of sensor 40 is supplied with power from secondary battery 450 so as to perform an operation.

Figure 6:
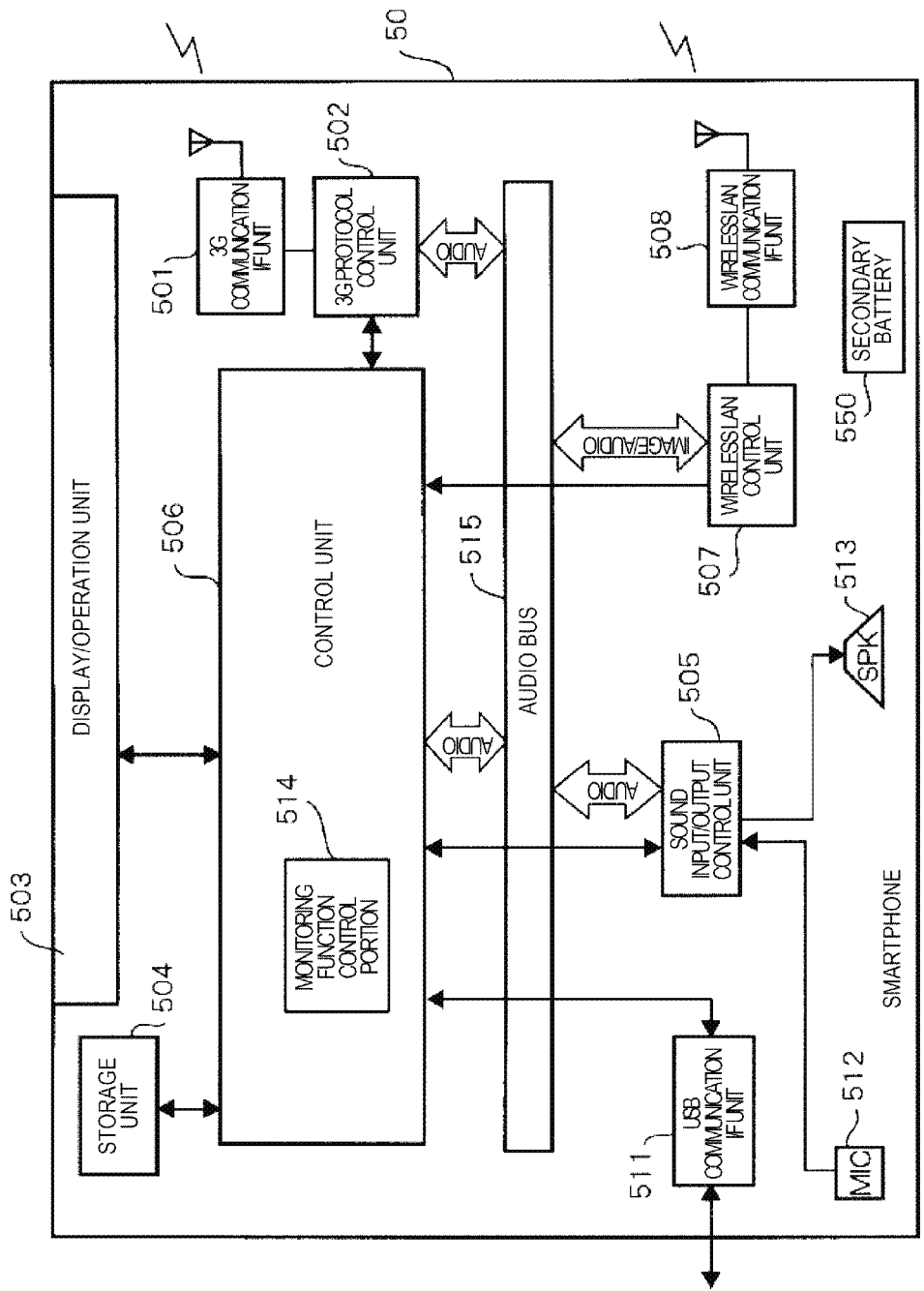
FIG. 6 is a block diagram illustrating an example of an internal configuration of a smartphone.

FIG. 6 is a block diagram illustrating an example of an internal configuration of smartphone 50. Smartphone 50 as an example of a mobile phone terminal includes control unit 506, storage unit 504, and display/operation unit (for example, touch panel) 503. Smartphone 50 receives various input operations and displays information such as an image on display/operation unit 503. Control unit 506 includes a processor and realizes a predetermined function by the processor executing a predetermined program. Monitoring function control portion 514 which can set various functions during an operation of monitoring camera system 5, such as a function of camera 30, is built into control unit 506.

As a program for realizing monitoring function control portion 514, an application for home security (hereinafter, referred to as a "home security application") is installed in smartphone 50 and is held in storage unit 504. Display/operation unit 503 constituted by a touch panel or the like, which is a display/input unit in which a display unit and an operation unit are integrally formed, displays information such as an image or an icon on a screen and receives a tap operation (or a touch operation) which is performed on the screen by a user of smartphone 50 (hereinafter, simply referred to as a "user").

Smartphone 50 includes 3G protocol control unit 502 and 3G wireless I/F unit 501, and performs wireless connection to mobile phone 70 or other smartphones connected to mobile phone network 75, by using a third generation (3G) wireless communication method. Smartphone 50 may include a protocol control unit and a wireless I/F unit corresponding to a wireless communication method (for example, HSPA or LTE) other than the 3G method.

Smartphone 50 includes audio bus 515, sound input/output control unit 505, speaker 513, and microphone 512, and performs input and output of sound to and from an external device.

Smartphone 50 includes wireless LAN control unit 507 and wireless LAN communication I/F unit 508, and transmits and receives image data and audio data to and from master device 10, camera 30, and the like via wireless router 60 connected over the wireless LAN.

Smartphone 50 includes USB communication I/F unit 511, and transmits and receives data to and from an apparatus, a memory, or the like having an interface of a universal serial bus (USB) standard. Smartphone 50 includes secondary battery 550 which is rechargeable, and each unit of smartphone 50 is supplied with power from secondary battery 550 so as to perform an operation.

A description will be made of an operation of monitoring camera system 5 having the above-described configuration.

First, descriptions will be made of an operation of smartphone 50, display of a screen and an input operation by using display/operation unit 503 during the operation. A description will be made of a case where the home security application installed in smartphone 50 is activated by the user.

Figure 7:
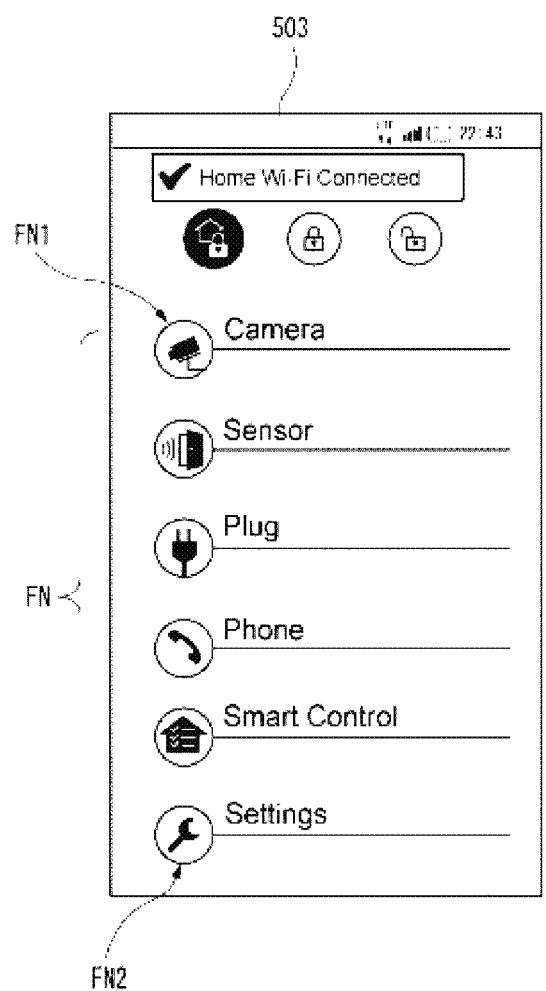
FIG. 7 is a diagram illustrating an example of an initial screen of a home security application.

FIG. 7 is a diagram illustrating an example of an initial screen of the home security application displayed on display/operation unit 503 of smartphone 50. In smartphone 50, when the home security application is activated, an initial screen is displayed on display/operation unit 503. Menu FN indicating a plurality of respective functions executed by the home security application is displayed on the initial screen. A plurality of menu items including an icon and a function name corresponding to each function are arranged and disposed in menu FN. The menu items of menu FN include camera FN1, a sensor, a power source plug, a phone, a smart control, and settings FN2.

If the user performs a tap operation on the icon of camera FN1 so as to perform an instruction operation, a monitoring screen which displays an image of a monitoring target captured by camera 30 is displayed on display/operation unit 503. If the user performs a tap operation on the icon of settings FN2 so as to perform an instruction operation, a setting screen for performing various settings of the home security application is displayed on display/operation unit 503.

FIG. 8 is a diagram illustrating an example of the setting screen of the home security application displayed on display/operation unit 503 of smartphone 50. The setting screen illustrated in FIG. 8 is a monitoring display setting screen for setting a display mode of a monitoring screen among a plurality of setting screens corresponding to various setting items. Display mode list MM indicating a plurality of settable display modes is displayed on the monitoring display setting screen (Quick Monitoring Access) of display/operation unit 503. A plurality of listed items including names corresponding to the respective display modes are arranged and disposed in display mode list MM. The listed items of display mode list MM include automatic (Auto), four-screen display (Quad View) MM1, a first camera (Camera1), a garden (Garden), a bedroom (Bedroom2), and the like. Content of display mode list MM can be set as appropriate by the user according to a system configuration. Herein, a case where the display mode of four-screen display MM1 is selected by the user is illustrated.

Figure 9B:
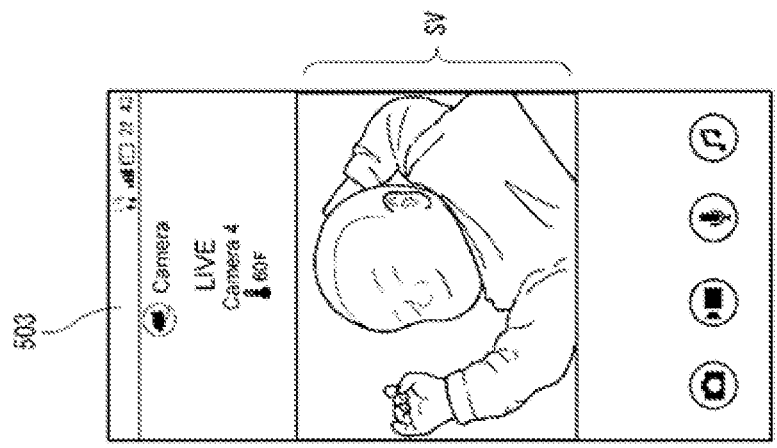
FIG. 9B is a diagram illustrating an example of a monitoring screen of the home security application.
Figure 9A:
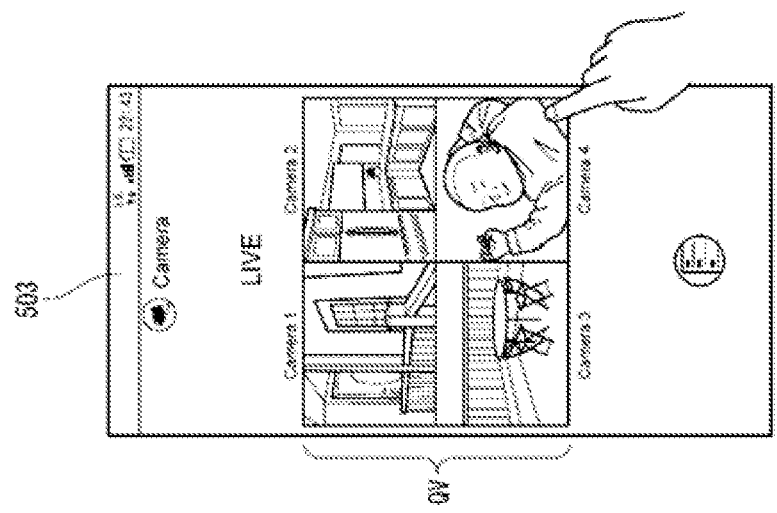
FIG. 9A is a diagram illustrating an example of a monitoring screen of the home security application.

FIGS. 9A and 9B are diagrams illustrating an example of a monitoring screen of the home security application displayed on display/operation unit 503 of smartphone 50. In a case where four-screen display MM1 is set as the display mode of the monitoring screen, if the user performs an instruction operation for displaying a monitoring screen, a monitoring screen including a plurality of separate images including four-screen display images QV illustrated in FIG. 9A is displayed. As four-screen display images QV, a plurality of images of monitoring targets, which are respectively captured by four cameras including camera1 (Camera1) to camera4 (Camera4) are arranged and displayed in a tiled form. Camera1 (Camera1) to camera4 (Camera4) respectively correspond to the plurality of cameras 30 disposed in monitoring camera system 5, and correspond to, for example, indoor camera 30A, monitoring camera 30B, and the like. In a case where three or less cameras are disposed in monitoring camera system 5, some of the four screens in four-screen display images QV are displayed blank. For example, in a case where there are three cameras, a single screen (camera4 or the like) is displayed blank. A plurality of separate images are not limited to four screens, and a display mode in which a plurality of any images are displayed on a single screen in a distributed manner may be employed according to a specification or a setting of the system.

If the user performs a tap operation on one (camera4 in the drawing) of four-screen display images QV so as to perform an instruction operation on the monitoring screen illustrated in FIG. 9A, a monitoring screen of a single image based on single-screen display image (typical display image) SV illustrated in FIG. 9B is displayed. In other words, the user can perform a switching operation of a display mode of the monitoring screen by performing an instruction operation on a single desired screen of four-screen display images QV. If the user performs a tap operation on single-screen display image SV so as to perform an instruction operation on the monitoring screen illustrated in FIG. 9B, a display mode is switched to the monitoring screen including four-screen display images QV illustrated in FIG. 9A. Through a user's instruction operation on the monitoring screen, display modes can be alternately switched to four-screen display images QV and any single-screen display image SV. Three or more display modes may be sequentially switched according to a user's instruction operation.

A description will be made of an operation of master device 10 related to the above-described operation of smartphone 50. In a case where a display operation of a monitoring screen is performed in monitoring camera system 5, master device 10 receives an instruction from smartphone 50, and transmits display screen information to be displayed on display/operation unit 503 to smartphone 50. At this time, master device 10 transmits an image data transmission request (image transmission request) to the plurality of cameras 30, and receives image data transmitted from each camera 30. Master device 10 creates image information of a monitoring screen corresponding to a set display mode on the basis of the image data acquired from cameras 30, and transmits the image information to smartphone 50.

Figure 10:
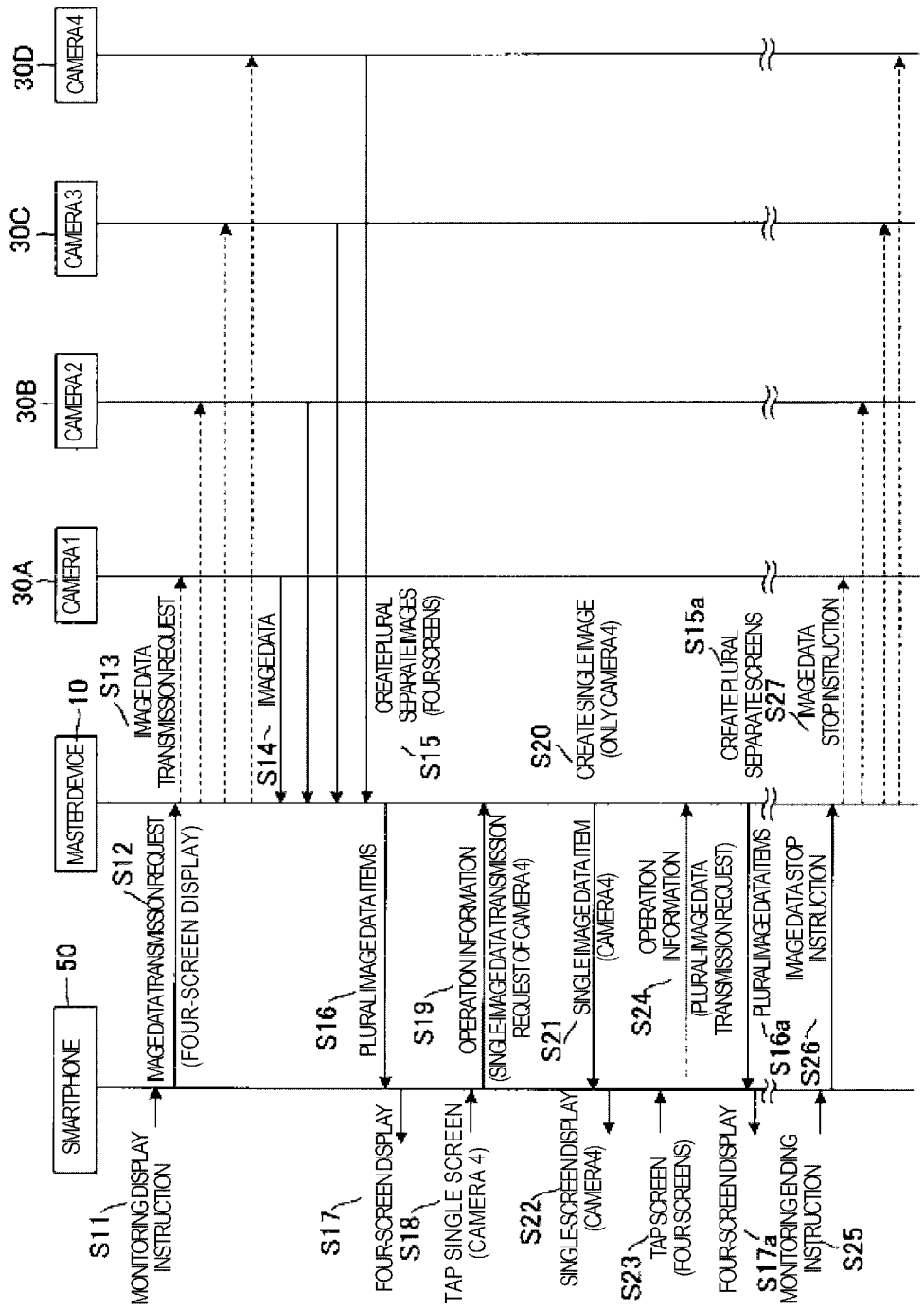
FIG. 10 is a sequence diagram illustrating a first example of an operation procedure of the monitoring camera system.

Next, a description will be made of a flow of an operation of monitoring camera system 5. FIG. 10 is a sequence diagram illustrating a first example of an operation procedure of monitoring camera system 5. Herein, a description will be made of an operation in which images of monitoring targets are respectively captured by four cameras including camera1 (indoor camera) 30A, camera2 (monitoring camera) 30B, camera3 30C, and camera4 30D, master device 10 creates a monitoring screen on the basis of images transmitted from respective cameras 30A to 30D, and the monitoring screen is transmitted to smartphone 50 and is displayed on display/operation unit 503. A display mode of the monitoring screen is set to four-screen display. The first example is an example in which master device 10 generates a monitoring screen of a plurality of separate images (four-screen display images QV) and a single image (single-screen display image SV) on the basis of a plurality of items of image data acquired from cameras 30A to 30D.

If smartphone 50 receives an input operation of giving a monitoring display instruction through a touch operation on display/operation unit 503 of smartphone 50 (step S11), smartphone 50 transmits an image data transmission request of four-screen display to master device 10 (step S12). If the image data transmission request is received from smartphone 50, master device 10 transmits the image data transmission request to each of cameras 30A to 30D (step S13). If the image data transmission request is received from master device 10, each of cameras 30A to 30D transmits image data of a monitoring target captured thereby to master device 10 (step S14). The image data includes at least one of video data of moving images and image data of still images.

Master device 10 creates image information of a monitoring screen for four-screen display as a plurality of separate images by using the plurality of items of image data acquired from cameras 30A to 30D (step S15). Master device 10 transmits the plurality of items of image data of the monitoring screen including four-screen display images QV to smartphone 50 (step S16). Smartphone 50 receives the plurality of items of image data transmitted from master device 10 and displays the monitoring screen of a moving image or a still image based on four-screen display images QV on display/operation unit 503 (step S17).

If a tap operation is performed on a specific single screen (for example, camera4) by the user and thus an input operation for single-screen display is received in a state in which the monitoring screen based on four-screen display images QV is displayed on display/operation unit 503 (step S18), smartphone 50 transmits operation information (a single-image data transmission request of camera4) to master device 10 (step S19).

If the single-image data transmission request of camera4 is received from smartphone 50, master device 10 creates image information of a monitoring screen for single-screen display of only camera4 as a single image by using image data acquired camera4 30D (step S20). Master device 10 transmits a single item of image data of a monitoring screen including single-screen display image SV of camera4 to smartphone 50 (step S21). Smartphone 50 receives the single item of image data transmitted from master device 10, and displays the monitoring screen of a moving image or a still image based on single-screen display image SV of camera4 on display/operation unit 503 (step S22).

If a tap operation is performed on the display screen by the user and thus an input operation for four-screen display is received in a state in which the monitoring screen based on single-screen display image SV is displayed on display/operation unit 503 (step S23), smartphone 50 transmits operation information (a plural-image data transmission request of four screens) to master device 10 (step S24).

If the plural-image data transmission request is received from smartphone 50, master device 10 creates image information of a monitoring screen for four-screen display by using a plurality of items of image data acquired from cameras 30A to 30D (step S15a). Master device 10 transmits the plurality of items of image data of the monitoring screen including four-screen display images QV to smartphone 50 (step S16a). Smartphone 50 receives the plurality of items of image data transmitted from master device 10 and displays the monitoring screen based on four-screen display images QV on display/operation unit 503 (step S17a).

If an input operation of giving an instruction for ending the monitoring is received through a touch operation or the like on display/operation unit 503 (step S25), Smartphone 50 transmits an image data stop instruction to master device 10 (step S26). If the image data stop instruction is received from smartphone 50, master device 10 transmits the image data stop instruction to each of cameras 30A to 30D (step S28). If the image data stop instruction is received from master device 10, each of cameras 30A to 30D stops transmission of image data to master device 10.

FIG. 11 is a sequence diagram illustrating a second example of an operation procedure of monitoring camera system 5. The second example is an example in which, in master device 10, an image request and link disconnection are performed on the plurality of cameras 30A to 30D, and, in a case of four-screen display, a plurality of items of image data are acquired and a monitoring screen of a plurality of separate images is generated, and, in a case of single-screen display, a single item of image data is acquired and a monitoring screen of a single image is generated.

If smartphone 50 receives an input operation of giving a monitoring display instruction through a touch operation on display/operation unit 503 of smartphone 50 (step S11), smartphone 50 transmits an image data transmission request of four-screen display to master device 10 (step S12). In this case, in the same manner as in the first example illustrated in FIG. 10, master device 10 acquires a plurality of items of image data from cameras 30A to 30D and transmits a plurality of items of image data for four-screen display to smartphone 50, and smartphone 50 displays a monitoring screen based on four-screen display images QV on display/operation unit 503 (steps S13 to S17).

If a tap operation is performed on a specific single screen (for example, camera4) by the user and thus an input operation for single-screen display is received in a state in which the monitoring screen based on four-screen display images QV is displayed on display/operation unit 503 (step S18), smartphone 50 transmits operation information (a single-image data transmission request of camera4) to master device 10 (step S19).

If the single-image data transmission request of camera4 is received from smartphone 50, master device 10 transmits a link disconnection instruction to camera1 30A, camera2 30B, and camera3 30C but not camera4 30D (step S31). In this case, cameras 30A to 30C disconnect links with master device 10 so as to stop transmission of image data, and only camera4 30D transmits image data of a monitoring target captured thereby to master device 10 (step S32). Master device 10 creates image information of a monitoring screen for single-screen display of only camera4 as a single image by using image data acquired camera4 30D (step S33). Master device 10 transmits a single item of image data of a monitoring screen including single-screen display image SV of camera4 to smartphone 50 (step S21). Smartphone 50 receives the single item of image data transmitted from master device 10, and displays the monitoring screen of a moving image or a still image based on single-screen display image SV of camera4 on display/operation unit 503 (step S22).

If a tap operation is performed on the display screen by the user and thus an input operation for four-screen display is received in a state in which the monitoring screen based on single-screen display image SV is displayed on display/operation unit 503 (step S23), smartphone 50 transmits operation information (a plural-image data transmission request of four screens) to master device 10 (step S24).

If the plural-image data transmission request is received from smartphone 50, master device 10 transmits an image data transmission request to cameras 30A to 30C which are link-disconnected (step S13a). If the image data transmission request is received from master device 10, each of cameras 30A to 30C transmits image data of a monitoring target captured thereby to master device 10 (step S14a).

Master device 10 creates image information of monitoring screen for four-screen display by using a plurality of items of image data acquired from cameras 30A to 30D (step S15a). Master device 10 transmits the plurality of items of image data of monitoring screen including four-screen display images QV to smartphone 50 (step S16a). Smartphone 50 receives the plurality of items of image data transmitted from master device 10 and displays the monitoring screen based on four-screen display images QV on display/operation unit 503 (step S17a).

As described above, monitoring camera system 5 of the present embodiment includes a plurality of cameras 30A to 30D each of which has image capturing unit 312 and a call function; master device 10 which performs communication with cameras 30A to 30D and is connected to fixed telephone network 85 so as to perform calls to another fixed telephone 80; and smartphone 50 which has display/operation unit 503, performs wireless communication with master device 10 by using wireless router 60, and is connected to another mobile phone 70 via mobile phone network 75.

Monitoring camera system 5 of the present embodiment can implement a monitoring system which is convenient to use at low cost by using a communication function of an existing fixed telephone.

In monitoring camera system 5 of the present embodiment, if a monitoring display instruction is received from smartphone 50, master device 10 transmits an image transmission request to the plurality of cameras 30A to 30D; each of cameras 30A to 30D transmits image data obtained by image capturing unit 312 to master device 10 in response to the image transmission request from master device 10; master device 10 generates a plurality of separate images for displaying images sent from the plurality of cameras 30A to 30D on a single screen in a distributed manner and transmits image data of a monitoring screen of the plurality of separate images to smartphone 50; and smartphone 50 displays the monitoring screen of the plurality of separate images transmitted from master device 10 on display/operation unit 503.

As mentioned above, since images of monitoring targets are acquired from a plurality of cameras, and a plurality of separate images such as four-screen display images QV are displayed on display/operation unit 503 of smartphone 50, it is possible to check the images from the plurality of cameras on smartphone 50. For this reason, it is possible to accurately monitor the monitoring targets. Since images from the plurality of cameras can be simultaneously checked, it is possible to understand security circumstances in a short period of time.

In monitoring camera system 5 of the present embodiment, if a single image display instruction is received from smartphone 50 in a state in which a monitoring screen of a plurality of separate images is displayed on display/operation unit 503 of smartphone 50, master device 10 transmits a monitoring screen of a single image corresponding to one of the plurality of separate images to smartphone 50, and smartphone 50 displays the monitoring screen of a single image transmitted from master device 10 on display/operation unit 503.

As mentioned above, a monitoring screen of smartphone 50 can be displayed in a switching manner between a plurality of separate images such as four-screen display images QV and a single image such as single-screen display image SV, and thus a camera image which is desired to be checked in detail can be displayed on the entire display screen alone. Therefore, it is possible to perform accurate checking.

In monitoring camera system 5 of the present embodiment, master device 10 generates a single image by using a single item of image data designated in a single image display instruction among a plurality of items of image data received from a plurality of cameras 30A to 30D, and transmits the generated single image to smartphone 50 as image data of a single image.

As mentioned above, in a case where a plurality of separate images and a single image are displayed in a switching manner, if images of the plurality of cameras are continuously received from master device 10, and master device 10 creates a monitoring screen of the plurality of separate images and the single image, it is possible to perform switching between the plurality of images and the single image in a short period of time.

In monitoring camera system 5 of the present embodiment, master device 10 stops transmission of image data from cameras (for example, cameras 30A to 30C) which capture images other than a single image designated in a single image display instruction among the plurality of cameras 30A to 30D, and transmits image data from a camera (for example, camera 30D) which captures the designated single image to smartphone 50 as image data of a single image.

As mentioned above, in a case where a plurality of separate images and a single image are displayed in a switching manner, if only a camera image as a display target is received from master device 10, camera images which are not displayed on a monitoring screen stop being displayed, and a monitoring screen of a plurality of separate images and a single image is created, it is possible to reduce communication loads on the master device and the cameras and thus to effectively utilize communication resources.

Although the various embodiments have been described with reference to the drawings, needless to say, the present invention is not limited to such embodiments. It is obvious that a person skilled in the art can conceive of various modifications or alterations within the scope recited in the claims, and thus it is understood that they naturally fall within the technical scope of the present invention. The respective constituent elements in the embodiment may be arbitrarily combined with each other within the scope without departing from the spirit of the present invention.

The invention claimed is:

1. A camera monitoring system comprising:
a plurality of cameras, each of the plurality of cameras including an imager and a communicator;
a master device that, in operation, wirelessly communicates with the plurality of cameras;
a smartphone having a home security application that realizes a monitoring function installed therein, the smartphone being connected to a mobile telephone network to which one or more other mobile telephones are connected; and
a wireless router disposed in a house, wherein the wireless router, in operation, provides a wireless local area network (LAN) that connects the master device and the smartphone,
wherein the master device, in operation, receives a first plural-image data transmission request, via the wireless router, from the smartphone, and in response to receiving the first plural-image data transmission request from the smartphone, transmits a first image request to the plurality of cameras,
wherein each of the plurality of cameras, in response to receiving the first image request from the master device, sends a respective one of a plurality of images to the master device, wherein the master device, after receiving the plurality of images from the plurality of cameras, forms a first multiple-segmented image that includes the plurality of images received from the plurality of cameras in multiple segments of the first multiple-segmented image, and transmits the first multiple-segmented image via the wireless router to the smartphone for display on the smartphone such that the smartphone receives the first multiple-segmented image via the wireless LAN provided by the wireless router,
wherein the master device,
after transmitting the first multiple-segmented image, receives a single-image data transmission request that identifies one of the plurality of cameras, via the wireless router, from the smartphone, and
in response to receiving the single-image data transmission request that identifies the one of the plurality of cameras, transmits a link disconnection instruction to each of the plurality of cameras other than the one of the plurality of cameras, forms a single-segment image that includes the one of the plurality of images received from the one of the plurality of cameras, and transmits the single-segment image via the wireless router to the smartphone.

2. The camera monitoring system of claim 1, wherein the master device, after transmitting the multiple-segmented image to the smartphone for display, and after receiving a display request directed to one of the multiple segments of the multiple-segmented image from the smartphone, transmits one of the plurality of images corresponding to the requested one of the multiple segments as a magnified single image to the smartphone for display on the smartphone.

3. The camera monitoring system of claim 1, wherein the master device, after receiving a display request directed to one of the multiple segments of the multiple-segmented image, generates a single image using image data of the one of the plurality of images corresponding to the requested one of the multiple segments and transmits the single image to the smartphone.

4. The camera monitoring system of claim 1, wherein the master device, after receiving a display request directed to one of the multiple segments of the multiple-segmented image, stops forwarding image data from one or more of the plurality of cameras other than the camera that images the requested one of the plurality of images, and forwards image data from the camera that images the requested one of the plurality of images as the single image to the smartphone.

5. The camera monitoring system of claim 1, wherein each of plurality of cameras further includes a wireless LAN communicator.

6. The camera monitoring system of claim 1,
wherein the master device,
after transmitting the single-segment image, receives a second plural-image data transmission request from the smartphone, via the wireless router, from the smartphone, and in response to receiving the second plural-image data transmission request from the smartphone, transmits a second image data transmission request to each of the plurality of cameras other than the one of the plurality of cameras, wherein each of the plurality of cameras other than the one of the plurality of cameras, in response to receiving the second image request from the master device, sends the respective one of the plurality of images to the master device, and wherein the master device,
after transmitting the second image data transmission request, receives the respective one of the plurality of images from each of the plurality of cameras other than the one of the plurality of cameras, forms a second multiple-segmented image that includes the plurality of images received from the plurality of cameras in multiple segments of the second multiple-segmented image, and transmits the second multiple-segmented image via the wireless router to the smartphone for display on the smartphone such that the smartphone receives the second multiple-segmented image via the wireless LAN provided by the wireless router.

7. A method in a camera monitoring system that includes a plurality of cameras, a master device that wirelessly communicates with the plurality of cameras, a smartphone having a home security application that realizes a monitoring function installed therein, the smartphone being connected to a mobile telephone network to which one or more other mobile telephones are connected, and a wireless router disposed in a house, the wireless router providing a wireless local area network (LAN) that connects the master device and the smartphone, the method comprising:

receiving, by the master device, a first plural-image data transmission request via the wireless router from the smartphone, in response to the receiving of the first plural-image data transmission request from the smartphone, transmitting, by the master device, a first image request to the plurality of cameras, in response to receiving the first image request from the master device, sending, by each of the plurality of cameras, a respective one of a plurality of images to the master device, and receiving, by the master device, the plurality of images from the plurality of cameras;

forming, by the master device, a first multiple-segmented image that includes the plurality of images received from the plurality of cameras in multiple segments of the multiple-segmented image;

transmitting, by the master device, the first multiple-segmented image via the wireless router to the smartphone for display on the smartphone such that the smartphone receives the first multiple-segmented image via the wireless LAN provided by the wireless router;

after the transmitting of the first multiple-segmented image, receiving, by the master device, a single-image data transmission request that identifies one of the plurality of cameras, via the wireless router, from the smartphone;

in response to the receiving of the single-image data transmission request that identifies the one of the plurality of cameras, transmitting, by the master device, a link disconnection instruction to each of the plurality of cameras other than the one of the plurality of cameras;

forming, by the master device, a single-segment image that includes the one of the plurality of images received from the one of the plurality of cameras; and transmitting, by the master device, the single-segment image via the wireless router to the smartphone.

8. The method of claim 7, further comprising:
receiving, by the master device, a display request directed to one of the multiple segments of the multiple-segmented image from the smartphone; and after the transmitting of the multiple-segmented image to the smartphone for display, and after the receiving of the display request directed to one of the multiple segments of the multiple-segmented image from the smartphone, transmitting, by the master device, one of the plurality of images corresponding to the requested one of the multiple segments as a magnified single image to the smartphone for display on the smartphone.

9. The method of claim 7, further comprising:
receiving, by the master device, a display request directed to one of the multiple segments of the multiple-segmented image from the smartphone;

after the receiving of the display request directed to one of the multiple segments of the multiple-segmented image, generating, by the master device, a single image using image data of the one of the plurality of images corresponding to the requested one of the multiple segments; and transmitting, by the master device, the single image to the smartphone.

10. The method of claim 7, further comprising:

forwarding, by the master device, image data from the plurality of cameras;

receiving, by the master device, a display request directed to one of the multiple segments of the multiple-segmented image from the smartphone;

after the receiving of the display request directed to one of the multiple segments of the multiple-segmented image, stopping, by the master device, the forwarding of image data from one or more of the plurality of cameras other than the camera that images the requested one of the plurality of images, and forwarding, by the master device, image data from the camera that images the requested one of the plurality of images as the single image to the smartphone.

11. The method of claim 7, wherein each of plurality of cameras further includes a wireless LAN communicator.

12. The method of claim 7, further comprising:

after the transmitting of the single-segment image, receiving, by the master device, a second plural-image data transmission request from the smartphone, via the wireless router, from the smartphone;

after the transmitting of the single-segment image, receiving, by the master device, a second plural-image data transmission request from the smartphone, via the wireless router, from the smartphone;

in response to the receiving of the second plural-image data transmission request from the smartphone, transmitting, by the master device, a second image data transmission request to each of the plurality of cameras other than the one of the plurality of cameras;

in response to receiving the second image request from the master device, sending, by each of the plurality of cameras other than the one of the plurality of cameras, the respective one of the plurality of images to the master device;

after the transmitting of the second image data transmission request, receiving, by the master device, the respective one of the plurality of images from each of the plurality of cameras other than the one of the plurality of cameras;

forming, by the master device, a second multiple-segmented image that includes the plurality of images received from the plurality of cameras in multiple segments of the second multiple-segmented image; and transmitting, by the master device, the second multiple-segmented image via the wireless router to the smartphone for display on the smartphone such that the smartphone receives the second multiple-segmented image via the wireless LAN provided by the wireless router.

* * * * *